July 6, 1965

H. H. ERNYEI 3,193,820

AUTOMATIC CONTROL SYSTEMS

Filed March 29, 1961

Inventor
Herbert Ernyei
By
Karl W. Flocks
Vaching

July 6, 1965

H. H. ERNYEI 3,193,820

AUTOMATIC CONTROL SYSTEMS

Filed March 29, 1961

United States Patent Office 3,193,820
Patented July 6, 1965

3,193,820
AUTOMATIC CONTROL SYSTEMS
Herbert H. Ernyei, Paris, France, assignor to Lignes Telegraphiques et Telephoniques, Paris, France, a joint-stock company of France
Filed Mar. 29, 1961, Ser. No. 99,280
Claims priority, application France, Mar. 30, 1960, 822,882, Patent 1,260,703; Apr. 1, 1960, 823,107, Patent 1,260,771
6 Claims. (Cl. 340—347)

The present invention has essentially for its object an improvement in automatic control circuits of the digital type, that is to say which operate on numbers representing in a given code the analog values of a physical controlling quantity or reference on the one hand and a controlled quantity or slave value on the other.

In these systems, use is necessarily made of two converters, one analog-digital and the other digital-analog, arranged on the one hand at the input of the control circuit, and on the other hand, in the vicinity of the actuating device. For reasons well known to those skilled in the art, the control circuit in which the data are processed operates on digital representations of the quantities, the representation being effected in most cases in the binary code.

When the operation of the digital-analog converter is considered, it can be seen that it receives a digital information which it must convert into an analog value to control the actuator. In certain particular cases, the actuating device can itself effect the digital to analog conversion. The basic principle of a digital-analog converter of this type, known per se, has been referred to in French Patent No. 1,260,770 filed by the present applicant.

The digital-analog converter is essentially constituted by a certain number of elements supplying a common circuit, each element being associated with the digit of a given order in the number fed to the input. As will be explained in more detail in the course of this description, the analog value corresponding to each element or weight increases rapidly with the order of the digit. From the practical point of view, this means that each of the elements of the converter represents a range of different values of the output quantity, which values become large when the corresponding digit order becomes high. We are therefore dealing with elements whose physical dimensions increase relatively rapidly and which in consequence have a growing inertia irrespective of their nature, whether hydraulic, pneumatic, electric, etc.

In an automatic regulation system, the inherent inertia of actuating elements of large size is necessarily accompanied by a delay between the instant at which the control is applied and the instant when it is completed, this delay being bound-up with what is usually called the proper time-constant of the element. The introduction of actuating elements with long time-constants in a control system limits the maximum speed of response of the whole of the control loop. In fact, when the data processing in the system is effected in a digital form, it can generally be considered that the time necessary for the processing is negligible as compared with the proper time-constant of the actuating elements of large dimensions.

When the digital-analog conversion is effected in the actuating device itself, and when the system utilizes the binary code, the actuating device comprises a relatively-large number of elements, the weights of which increase acording to the law $2^0, 2^1, 2^2, 2^3, \ldots 2^{n-1}$. The time-constants of these various elements differ very substantially.

Let us consider what happens in an automatic control loop when an increase of the output number from the digital circuit requires a unit of relatively high order to participate. Normal operation of the digital to analog converter takes place in the following manner assuming binary code is used: change of state of all the elements corresponding to the units of lower order in one direction (from 1 to 0), and change of state in the other direction from (0 to 1) of the element of larger inertia associated with the figure of higher order. In view of the difference between the time-constants of a large element with respect to small ones, the control which should result in an increase of the controlled quantity will actually result in an immediate decrease of that quantity as a result of the quicker switching off of the elements associated with the unit of lower order and of the slower switching on of the element associated with the unit of higher order. There is therefore obtained an effect which is the contrary of that desired.

The present invention has for its object an improved digital system for an automatic control circuit enabling the defect which has just been described above to be obviated. It has for its object to compensate artifically for the delay inherent in the elements of high weight in an automatic control circuit, by preventing any modification in the state of the elements of lower weight until the modification in the state of the element of higher weight creates an unbalance or error, the compensation of which results automatically in the modification of the state of the elements of lower weight, as a consequence of the natural operation of the control system.

The elements of lower weights are switched at the same rate as the element of high weight. In this way, the regulation system according to the invention ensures automatic compensation of errors resulting from the physical nature of the actuating device.

The present invention has essentially for its object the use of logic circuits to dissociate the operation of the elements relative to the units of lower weight from that of the control elements relative to the units of higher weight. It is further characterised by the use in an automatic control system of a counting circuit which continuously receives pulses having a repetition frequency characterising the value of the error which has to be made zero, in combination with a circuit determining the direction of the said error and of a logic circuit responsive to the action in the number registered by the counter of a unit of higher order, the said logic circuit having the function of blocking the said counter until the direction or sign of the error has changed consequent to the establishment of the modification of operation of the control circuit element associated with the unit of higher order.

A circuit for determining the algebraic value of the error which can be employed in carrying the present invention into effect, is particularly described in French patent application No. 822,881 filed by the present applicant.

The invention will be more clearly understood by reference to the description which follows and to the figures of the accompanying drawings given by way of illustration without any limitative sense, of the application of the invention to a control system of the digital type utilizing the binary code.

Figure 1:
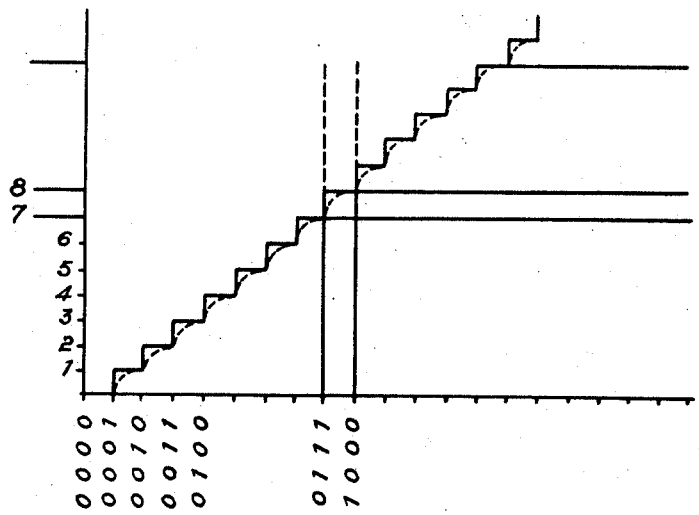
FIG. 1 shows graphical correspondence between analog and binary representation.

There has been shown in FIG. 1 the law of correspondence between an analog quantity and its binary representation. As ordinates there are given in the horizontal direction the numbers inscribed in the binary code and as abscissae the corresponding analog quantities quoted in the decimal code. The law of correspondence is a discontinuous law which has the form of a stepped curve (quantified magnitudes). As can be seen, a transition from the value 3 to the value 4 corresponds to the change from the number 011 to the number 100, which includes a digit of order 3 and modifying the representative state of the digits of orders 1 and 2. In the same way, the transition from the value 7 to the value 8 corresponds to the replacement of the number 0111 by the number 1000. As has been stated above, when there is associated with each unit an element of the analog transducer, the weight of which corresponds to the value of the unit, it is possible to obtain a transducer curve similar to that of FIG. 1, at the end of a period of time which may be very long. If the transducer output is examined during the said period the variation of said output with time is controlled by the time-constants inherent in each element of the transducer.

Figure 2:
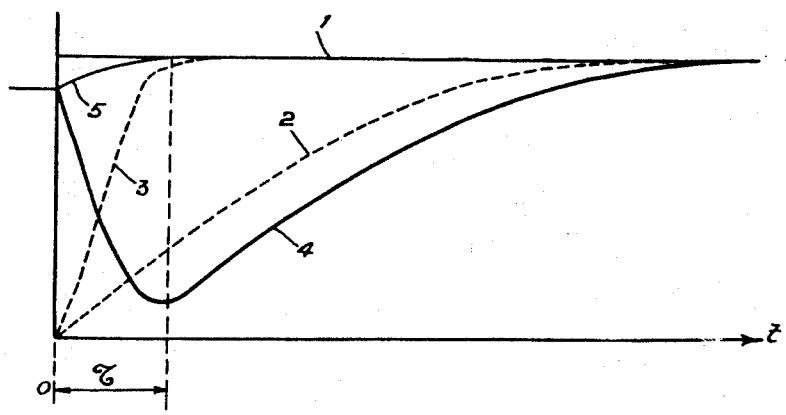
FIGS. 2 and 3 shows curves of the output of the transducer as a function of time.

The variation as a function of time of the value of the output of the transducer is represented by the curves of FIG. 2. It will be assumed that 1 is the theoretical curve corresponding to the increase of one quantum in the output quantity between 7 and 8 (see curve of FIG. 1) and that curve 2 is the switching curve of the transducer element with a weight corresponding to a unit of order 4.

Assume that curve 3 is the law of establishment or law of response as a function of time of the elements of lowest weights (units of order 1 to 3 inclusive). The inherent time-constants of these elements are very close together and very small compared to that of the element corresponding to order 4.

As can be seen from curves 2 and 3, the switching on of the element of the fourth order is much slower than the switching off of the smaller weight elements. Since the speed of response is defined by the physical dimensions of the element corresponding to the control device, it is impossible to reduce this below a given value which may remain very high as compared with the sampling period or measurement period employed in the control loop. The value of the quantity at the output of the converter is constituted by the difference (curve 4) between the curves 2 (switching on of the element of the 4th order) and the curve 3 (switching off of the small elements). The time-constants in both directions are closely related. As can be seen from a curve 4 in full lines, the value of the output quantity, which was to change from 7 to 8, diminishes following a law corresponding to the difference of the speeds of response shown by the curves 2 and 3. Then, at the end of a period greater than the time-constant of all the elements of low weight, the value begins to rise. The desired switching law is shown by the curve 5, T being the sampling period utilized in the control loop.

Figure 3:
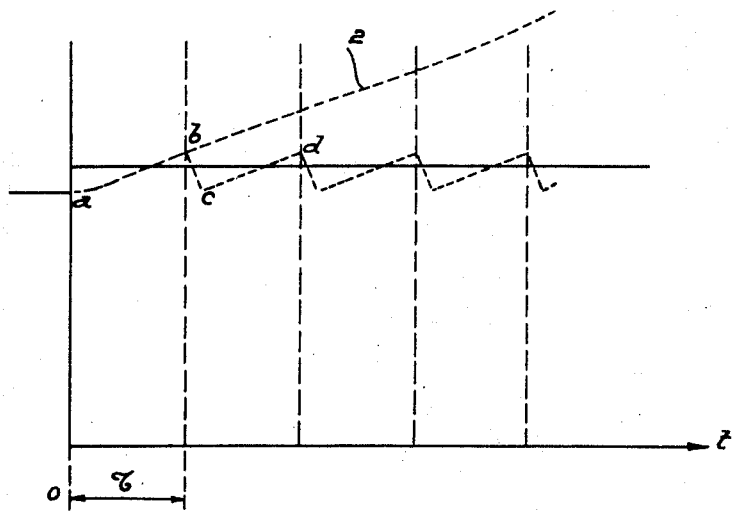

The present invention has for its object to eliminate this reduction by suppressing the command for elimination of the elements of the actuator associated with the low weights, while switching on the element of high weight, this being continued until the value of the output quantity from the transducer exceeds the correct value or reference value as represented by the full horizontal line (see FIG. 3: segment $ab$).

At this moment, the error signal applied to the control loop changes sign and the circuit receives a control corresponding to a reduction of the output value controlled. This control results in the switching off of the element of the transducer of the smallest weight, segment $bc$. During this time, the building up of the element of high weight continues. When once the reduction relative to the switching off of the element of minimum weight is compensated by increase of the quantity due to the building up of the said element of high weight, the error again becomes an error in excess of the value of the controlled quantity, segment $cd$. This error increases and causes the elimination of the element associated with the unit of the second order and the re-establishment of that of the first order. Then the elimination of the two elements, and so on.

In this way, the dip which appears on curve 4 has been removed. It will be noted that the control is performed without causing any oscillation of the actuator element of high weight, which constitutes an important advantage of the control loops produced according to the invention. Only the elements of lower weight are subjected to modifications of conditions of working.

Figure 4:
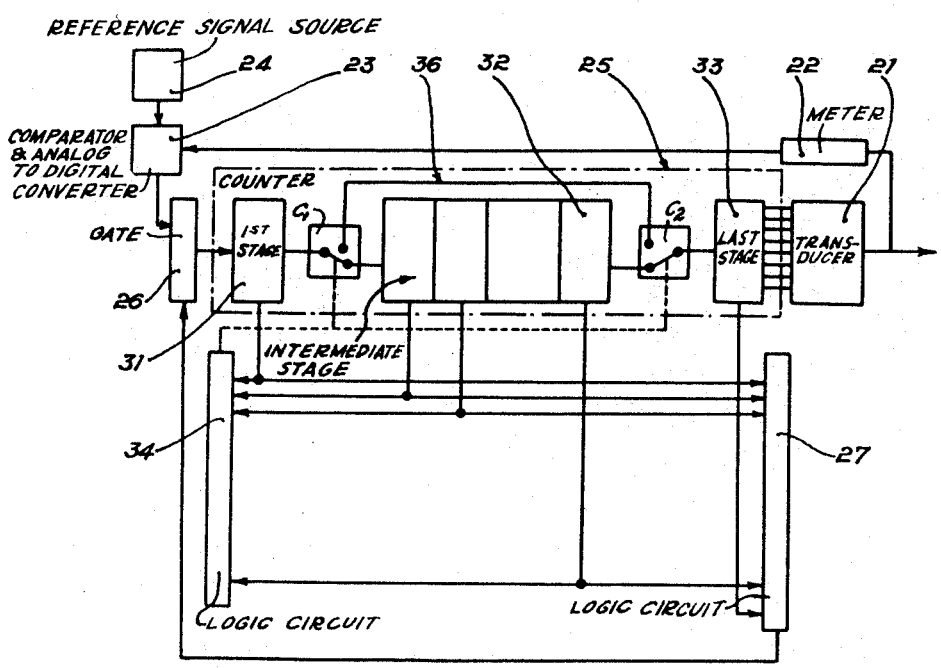
FIG. 4 is a block diagram representation of the control loop in accordance with the present invention.

FIG. 4 is a diagram of a control loop according to the invention. There has been shown at 21 the control element which includes the analog as has been previously explained. The value of the output quantity at 21, measured in the element 22, supplies a comparison circuit 23 which also receives the reference value of the controlled quantity delivered by the reference-signal source 24. The error signal delivered by the comparison circuit 23 supplies the arithmetic unit 25 through a gate 26 controlled by the logic circuit 27 associated with the arithmetic unit 25. The latter supplies the transducer (digital-analog) 21.

For the sake of simplicity, it will be assumed that the comparison element 23 effects the analog conversion of the error signal. The arithmetic unit 25 is essentially constituted by a binary counter comprising a certain number of stages, four for example if reference is made to the figure given above, it being understood that this number is given by way of example and without limitation.

As shown, the first stage of the counter 31 is coupled to the following stages through the intermediary of a 3 way switch $C_1$ coupled to a second switch $C_2$, arranged between an intermediate stage 32 and the last stage of the counter 33. Switches $C_1$ and $C_2$ are controlled by a first logic element 34. A second logic element 27 controls gate 26.

As shown by the position of the switches $C_1$ and $C_2$ indicated in the drawing, the first stage 31 of the counter 25 is connected to the following stages 32 which are connected in turn in series with the final stage 33, in accordance with conventional practice. When the switches $C_1$ and $C_2$ are in the other position, it can be seen that the stage 31 of the counter 25 supplies the output stage 33 of the counter directly through the conductor 36.

Figure 5:
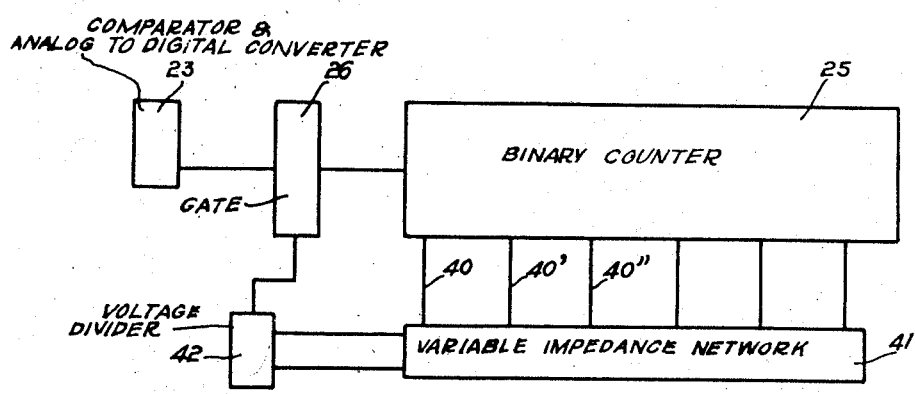
FIG. 5 is a block diagram of connections to the logic circuits.

The various intermediate stages 32 and the first stage 31 of the counter 25 are connected to the two logic elements 34 and 27. The final stage 33 of the counter is connected only to the logic element 27. The nature of the logic circuits 34 and 27 is exactly the same. A particular embodiment of such circuits is described below (FIG. 5 etc.).

As will be explained, the logic circuits 34 and 27 are adapted to check whether all the stages of the counter which are connected to them are in the position 1 or in the position 0, or more generally if the associated stages of the counter register a given count. The function of the logic element 27 is to interrupt the supply of the counter by gate 26 when the counter registers its maximum capacity.

It is indeed necessary to prevent counter 25 from being set back at zero by the pulse which would follow that corresponding to the recording of the maximum capacity of the said counter, until the error changes sign. If it is assumed, for example, that the error corresponds to a difference, due to a defect between the measured quantity and the reference value at the moment when the counter registers its maximum capacity, the counter is blocked. The value transmitted to the actuator has the effect of causing the value of the controlled output to increase. When it exceeds the reference value, the sign of the error reverses, the signal characteristic of the sign of the error is applied to 27 and causes the opening of gate 26 with the consequent release of the counter 25.

The said signal is delivered by a circuit incorporated with the comparison circuit 23 delivering the coded information corresponding to the error signal. A possible embodiment of such a circuit is described in French Patent No. 1,260,702 filed by the present applicant.

It is assumed that the logic circuit 34 is associated with all the stages of the counter corresponding to elements of the control device having identically the same inherent time-constant which is small compared with the sampling period. When the stages 31 and 32 of the counter register the corresponding maximum capacity, that is to say when they are both in position 1, the logic circuit 34, constituted in identically the same way as circuit 27, delivers a signal which has the effect of operating the switches $C_1$ and $C_2$ so as to close the lower contacts, that is to say in such manner that the first stage of the counter is directly connected to the last stage. Switches $C_1$ and $C_2$ may for example be electronic switches. When the intermediate stages register an intermediate number, the switches $C_1$ and $C_2$ are in the position shown in the figure, such that the various stages of the counter are normally associated with each other.

The operation of the whole assembly can be summarized as follows: as long as the reduced counter, that is to say the counter constituted by the elements 31 and 32 and excluding the last stage 33, registers an intermediate value, the counter operates in the normal manner. When the counter reduced to 31 and 32 registers the corresponding maximum capacity, that is to say at the moment when the following pulse would return to zero the stages of the limited counter and cause the switching-on of the stage 33, the position of the switches $C_1$ and $C_2$ is modified, and the following pulse is directly transmitted from 31 to 33, causing the stage 33 to switch-on without modifying the electrical condition of the intermediate stages 32, which means that at that moment the elements of the control device 21 associated with the stages of the counter corresponding to the units of low order remain in the same state as previously, namely the state 1; as has been stated above, the elements in question are those having inherent time-constants which are relatively small compared with the sampling period.

The element associated with the stage 33 begins to participate in the output quantity. The triggering of the stage 33 has the effect of preventing the arrival of new pulses on the counter by closing gate 26 by means of logic 27. The output increases along $ab$ (FIG. 3) and the error becomes an excess error. The signal of the sign of the error changes and gate 26 is open. The subtraction is effected, resulting in the return to their initial position of the electronic switches $C_1$ and $C_2$ as a result of the change in state of the first stage 31 of the counter 25. The stage 33 of the counter remains in the position "1," and the quantity at the output, after an abrupt reduction $bc$, due to switching off of the element associated with stage 31 of the counter, continues to increase. The decrease is too rapid to be sampled (duration short with respect to sampling period). At the moment of measurement, the error is again an excess error which is applied to the counter, and so on.

In the foregoing description, it has been assumed that only the time-constant of the element associated with the stage 33 was large as compared with the sample period. In complex systems, this condition may be verified for a number of stages of high order and of different time-constants. It is then necessary to divide the counter into several sub-groups comprising the stages of similar time-constants, each sub-group being associated to a logic circuit 34 with each sub-division so made.

Figure 6:
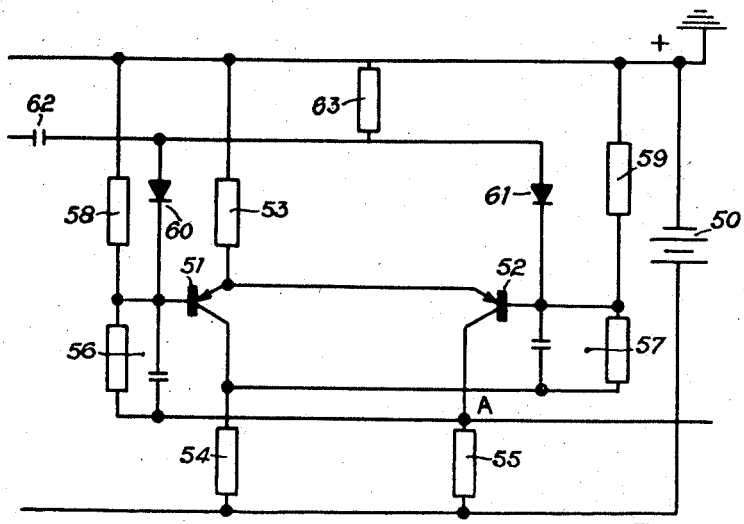
FIGS. 6 and 7 are detail schematic representations of parts of FIG. 5.
Figure 7:
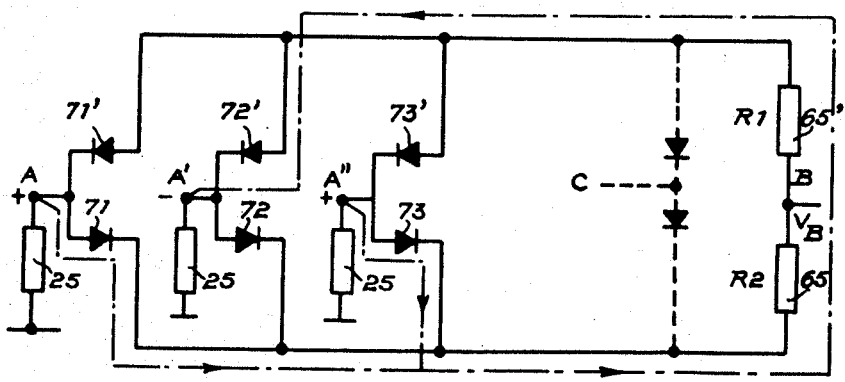

FIG. 5 is a basic diagram of the circuit 27 and FIGS. 6 and 7 are detailed diagrams.

There has been shown at 25 the binary counter, assumed to comprise six stages as above and is fed with pulses from a source 23 through gate 26. Each stage of the counter 25 is coupled by a connection 40, 40', 40" ... to a variable impedance of network 41. The impedances of the network are inter-connected in parallel to the terminals of a voltage-dividing circuit 42, an intermediate point of which controls gate 26.

When the pulses delivered by the source 23 are supplied to the counter, various stages are triggered one after the other as is well known. The potential of the characteristic point to which each of the impedances of the network 41 are connected, defines at each instant the electrical state of the corresponding binary stage or flip-flop. When all the stages of the counter are in the condition "0," network 41 maintains a relatively-high potential ($V_{00}$) at the intermediate point of the voltage divider 42. If on the other hand the counter reaches its maximum capacity, the network 41 produces a relatively low potential ($V_{11}$) at the intermediate point. This potential is employed to control gate 26.

A binary stage of the Eccles-Jordan type shown in FIG. 6 which constitutes the stages of counter 25, is well known to those skilled in the art. Its method of operation will be briefly described. This stage is essentially constituted by two transistors 51 and 52 respectively, the two emitters of which are connected by a common load impedance 53 to the positive terminal of a direct-current supply source 50, the negative terminal of which is connected to the collector through the intermediary of the load resistors 54 and 55. The positive terminal of 50 is assumed to be connected to earth.

The two transistors are cross-connected in multi-vibrator coupling, the base of 51 being connected to the collector 52 through the resistor-capacitor circuit 56, the circuit 57 ensuring the reverse coupling. The biasing of the base electrodes is obtained by the resistors 58 and 59.

The pulses to be counted are applied in the form of pulses of positive polarity derived through the resistor-capacity circuit 62–63 to the bases of the two transistors by diodes 60 and 61. These diodes have the purpose of directing, by means of their polarization dependent on the condition of the flip-flop, the input pulse either to one or the other of the transistors, so as to block the current in the transistor concerned.

When transistor 51 is conducting (flip-flop in the zero state), the transistor 52 is blocked, and the potential at the point A is close to the negative potential of the supply source 50 ($V_0$). When transistor 52 is conducting (flip-flop in the state 1), a current passes through the resistor 55 of the collector towards the source, and the potential of the point A ($V_1$) is in the vicinity of zero.

The homologous points of A, A', A", etc., of the various stages constituting the counter 25 are connected to each of the impedances of the network 41. They constitute the points, the potential of which characterises the electrical condition of the corresponding stage.

FIG. 7 represents the impedance network 41, each of the elements of which is connected to the point A of a stage of the binary counter, the said elements being connected in parallel at the terminals of a potential divider 65–65', represented by $R_1$ and $R_2$. As shown in the drawings, each of the elements of the circuit is constituted by a couple of diodes respectively connected in series 71–71', 72–72', 73–73', etc., the common points A, A', A", etc. of which are connected to the point A of each of the stages of the binary counter 25.

As will be clear from the explanation of the operation of the binary counter stage shown in FIG. 6, it is known that the potential of point A depends on the condition of the associated stage $V_0$ (negative) and equal to the supply voltage of the transistors of the binary stages, or $V_1$ (almost zero). The resistors $R_1$ and $R_2$ are chosen with very high value as compared with the direct resistance of the diodes, when they are conducting. If it is assumed that the first stage of the counter is in the condition one the potential of the point A is $V_1$ (positive). The diode 71 therefore conducts a current which passes through the resistors $R_2$ and $R_1$. The circuit is closed through a diode of those having reference numerals marked with a dash which is associated with a flip-flop in the zero condition, namely the diode 72' in the case shown in FIG. 7, since the potential of the point A' is shown as negative ($V_0$).

If all the points A are at the same positive potential (the counter registering maximum capacity), the D.C. circuit is no longer closed and no current passes through the resistors $R_2$ and $R_1$. This is also the case if all the points A are at the same negative potential (the counter registering zero count). For any other numbers registered by the counter, a current passes through the resistors $R_1$ and $R_2$. If the point B, common to the two resistors, is considered, it can be seen that the potential $V_B$ at this point can be either equal to $V_0$ (maximum count) or to $V_1$ (zero count), or to an intermediate value (intermediate counts). The potential $V_B$ is utilized for the control of the gate 26.

I claim:
1. Digital apparatus comprising
   a chain of digital circuits adapted to process digital information and producing an output binary control signal and including
      an electronic counter receiving the digital information and divided into three groups,
         the first said group containing the stage of the lowest order,
         the second said group containing at least one intermediate order stage,
         the third said group containing at least one higher order stage,
      and switching devices connecting said groups;
   binary weighted elements actuated by said output binary control signal from said chain of digital circuits;
   and logic circuit means connected to said chain of digital circuits to operate said switching devices to prevent any modification in the state of said first and said second groups until the modification in the state of said third group.

2. Apparatus in accordance with claim 1, in which said logic circuit means includes a source of direct current associated with a voltage-dividing circuit, at least one pair of series-connected diodes connected to the terminals of said voltage-dividing circuit, the common junctions of each said at least one pair of series-connected diodes being each connected directly to outputs from said chain of digital circuits.

3. Digital apparatus comprising
   a chain of digital circuits adapted to process digital information and producing an output binary control signal and including
      an electronic counter receiving the digital information, said counter being divided into three groups,
         the first said group containing the stage of the lowest order,
         the second said group containing at least one sub-group,
            each said at least one sub-group containing a plurality of intermediate order stages,
         the third said group containing at least one higher order stage,
      and switching devices connecting said groups;
   gating means supplying digital information to said electronic counter;
   binary weighted elements actuated by said output binary control signal from said chain of digital circuits;
   and logic circuit means connected to said chain of digital circuits adapted to interrupt the supply of said digital information to said weighted elements except said digital information associated with said higher order stage for the whole period during which the most significant said digital information retains the same state including
      control means for controlling said switching devices according to the state of the stages constituting the first two groups of said counter,
      and operating means for operating said gating means responsive to the state of the stages forming the complete counter and to the change of state of the said digital information.

4. Apparatus as claimed in claim 3, in which said control means includes a source of direct current associated with a voltage-dividing circuit, at least one pair of series-connected diodes connected to the terminals of said voltage-dividing circuit, the common junctions of each said at least one pair of series-connected diodes being each connected directly to the output of a given stage of said electronic counter.

5. Apparatus as claimed in claim 3, in which said operating means includes a source of direct current associated with a voltage-dividing circuit, at least one pair of series-connected diodes connected to the terminals of said voltage-dividing circuit, the common junctions of each said at least one pair of series-connected diodes being each connected directly to the output of a given stage of said electronic counter.

6. Digital apparatus comprising
   a chain of digital circuits adapted to process digital information and producing an output binary control signal
   binary weighted elements actuated by said output binary control signal from said chain of digital circuits and including
      at least one each of a lower, intermediate, and higher weight element,
   and logic circuit means responsive to said chain of digital circuits to prevent any modification in the state of said at least one lower and intermediate weight elements until the modification in the state of said at least one higher weight element results in the simultaneous initiation of a modification of the state of said at least one lower and intermediate weight elements.

References Cited by the Examiner
UNITED STATES PATENTS

| 2,717,994 | 9/55 | Dickinson et al. | 340—347 |
| 3,100,298 | 8/63 | Fluhr | 340—347 |

MALCOLM A. MORRISON, *Primary Examiner.*